United States Patent [19]
Herwig et al.

[11] 3,962,368
[45] June 8, 1976

[54] LINEAR POLYESTER MOLDING COMPOSITION CONTAINING CROSS-LINKED LINEAR POLYESTER AS A NUCLEATING AGENT

[75] Inventors: Walter Herwig, Neuenhain, Taunus; Rudolf Kern, Mainz, both of Germany

[73] Assignee: Hoechst Aktiengesellschaft, Frankfurt am Main, Germany

[22] Filed: May 14, 1974

[21] Appl. No.: 469,911

Related U.S. Application Data

[62] Division of Ser. No. 253,196, May 15, 1972, Pat. No. 3,843,615.

[30] Foreign Application Priority Data

May 17, 1971  Germany.............................. 2124336

[52] U.S. Cl.............................. 260/835; 260/28 R; 260/860; 260/873
[51] Int. Cl.²................... C08G 45/14; C08G 39/10
[58] Field of Search.......... 260/835, 860, 873, 75 R, 260/836, 837

[56] References Cited

UNITED STATES PATENTS

| | | | |
|---|---|---|---|
| 3,560,605 | 2/1971 | Siggel et al. ..................... | 260/535 X |
| 3,673,139 | 6/1972 | Hrach .............................. | 260/22 R |

FOREIGN PATENTS OR APPLICATIONS

| | | | |
|---|---|---|---|
| 6,511,744 | 2/1967 | Netherlands.......................... | 260/75 |
| 1,222,664 | 2/1971 | United Kingdom................. | 260/860 |

*Primary Examiner*—Murray Tillman
*Assistant Examiner*—T. Pertilla
*Attorney, Agent, or Firm*—Curtis, Morris & Safford

[57] ABSTRACT

Thermoplastic molding compositions containing a small amount of a cross-linked polyester as nucleating agent can be processed into high quality shaped articles having a high degree of crystallization.

18 Claims, No Drawings

LINEAR POLYESTER MOLDING COMPOSITION CONTAINING CROSS-LINKED LINEAR POLYESTER AS A NUCLEATING AGENT

This is a division of application Ser. No. 253,196, filed May 15, 1972, now U.S. Pat. No. 3,843,615.

The present invention relates to thermoplastic polyester molding compositions having improved properties.

Polyesters of aromatic dicarboxylic acids and aliphatic or cycloaliphatic diols can be processed by injection molding into partially crystalline shaped articles. Injection molding of polyethylene terephthalate has gained industrial importance. The pure unmodified polyester has, however, only a poor dimensional stability. When it is heated it shrinks considerably, above all at a temperature above the second order transition temperature, owing to after-crystallization, it loses its shape and dimensional stability. Consequently, unmodified polyethylene terephthalate cannot be used for making technical articles as only a high degree of crystallization ensures dimensional stability and stability of shape. A great number of publications propose to modify polyethylene terephthalate with crystallization promoting agents (cf. for example Netherlands Pat. Application 6,511,744). There may be used, for example, finely divided solid inorganic substances. These substances which should have a particles size below 2 microns are named nucleating agents. As solid inorganic substances there have been proposed metal oxides, alkaline earth metal salts, glass powder, pyrophyllite, carbon black, talcum or metals. Most solid inorganic substances have an insufficient nucleating action even with very small particles, and as foreign substances they may detrimentally affect the mechanical properties of the polyesters, for example toughness, they may involve colorations and sometimes they may even be dangerous from physiological point of view.

It has also been proposed to use polymers as additives, for example polyethylene, polypropylene, or poly-4-methylpentene-1. But in many cases their influence on the dimensional stability and crystallization properties is not at all satisfactory.

The present invention provides thermoplastic molding compositions consisting of a mixture of
a. linear saturated polyesters of aromatic dicarboxylic acids which may contain up to 10% by weight, calculated on the total amount of dicarboxylic acids, of aliphatic dicarboxylic acids, with saturated aliphatic or cycloaliphatic diols and
b. 0.05 to 2% by weight, preferably 0.1 to 1.0% by weight, calculated on the saturated linear polyester a) of a cross-linked saturated polyester of terephthalic acid or an ester-forming derivative thereof, a diol having from 2 to 10 carbon atoms, preferably a diol of the formula HO—(CH$_2$)$_n$—OH in which $n$ is 2 to 10, for example ethylene glycol, and 0.01 to 3% by weight, calculated on the cross-linked saturated polyester, of at least one cross-linking polyfunctional compound, which molding compositions are especially suitable for being processed in economic manner by injection molding into partially cyrstalline shaped articles.

As linear saturated polyester of aromatic dicarboxylic acids polyethylene terephthalate is preferably used. It is likewise possible, however, to use other polyesters, for example polycyclohexane-1,4-dimethylol terephthalate.

It is also possible to use modified polyethylene terephthalates which contain, besides terephthalic acid structural units, units of other aromatic or aliphatic dicarboxylic acids, for example isophthalic acid, naphthalene-2,6-dicarboxylic acid or adipic acid. Alternatively, modified polyethylene terephthalates may be used which contain as alcoholic component besides ethylene glycol other aliphatic diols, for example neopentyl glycol or butane-diol-1,4. Polyesters of hydroxycarboxylic acids may also be used.

Suitable cross-linking polyfunctional compounds, which are used either individually or in admixture with one another are, preferably: compounds having more than two groups capable of forming esters, for example 1,1,4,4-tetramethylol-cyclohexane, pyromellitic acid, pentaerythritol, trimethylol-propane, trimesic acid, cyclopentane-tetracarboxylic acid, or the anhydride thereof, or diglycidyl ethers of the formula

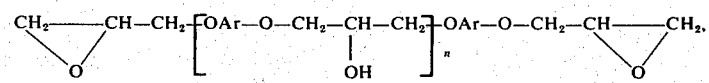

in which Ar represents a bivalent aromatic radical containing one or several substituted or unsubstituted nuclei which are bound to one another directly or via hetero atoms and/or aliphatic intermediate links and $n$ is greater than or equal to zero; or epoxides of the general formula

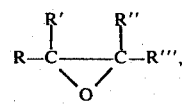

in which R′, R″, and R‴ each represents hydrogen or an alkyl group and R stands for an alkyl, cycloalkyl, aralkyl or aryl group possibly containing an ether group and carrying at least one epoxide group, for example 1,4-butanediol-di[β-methylglycidyl] ether; or cyclic epoxides of the general formula

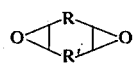

in which R and R′ each represents an alkylene, cycloalkylene, aralkylene or arylene group which may be linked to form a bi- or polycylic ring either directly or via one or several carbon atoms and which may contain epoxide groups, for example cyclooctadiene-(1,5)-diepoxide, or 2,3-epoxy-propanol esters of polyfunctional carboxylic acids of the general formula

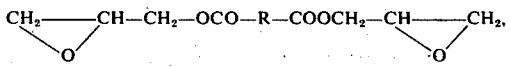

in which R repesents an alkylene, cycloalkylene, arylene or aralkylene group which may contain ether groups and possibly further carboxylic groups esterified with 2,3-epoxy-propanol, for example bis-2,3-epoxy-propanol-succinic acid ester.

The special advantage of the molding compositions according to the invention resides in the fact that a saturated polyester is nucleated with a small amount of a likewise saturated polyester, i.e. a chemical analog, which does not detrimentally affect the mechanical properties of the polyester.

The polyesters according to the invention are preferably produced in the following manner: a polyester prepared by condensation in the melt from terephthalic acid or a dialkyl ester thereof, for example dimethyl or dibutyl terephthalate, ethylene glycol and a polyfunctional compound, for example cyclopentane-tetracarboxylic acid in the form of granules and having a reduced specific viscosity of about 0.8 dl/g, measured at 25°C in 100 milliliters of a mixture of phenol and tetrachloroethane in a weight ratio of 3 : 2, is subjected to after-condensation in a rotating vessel under a pressure of 0.5 mm of mercury at 280°C until the granules are only swellable in the above solvent mixture but no longer soluble owing to crosslinking. The granules thus treated are ground to a powder having an average particle size below 60 microns, preferably below 10 microns, the powder is used to coat polyethylene terephthalate granules in an amount within the indicated range, for example 0.7% by weight, and the coated granules are melted in an injection molding machine and shaped articles are made therefrom. When the compositions according to the invention are molded in a heated mold shaped articles having a satisfactory degree of crystallization are obtained after a short dwell time in the mold.

The nucleating cross-linked polyester can also be added in different manner. The after-condensed granules can be melted with the linear polyester in an extruder, the melt can be homogenized, extruded into water and granulated. The granules thus obtained must be dried and, if necessary, again subjected to after-condensation in the solid state.

Alternatively, the after-condensed and modified granules may be added to the mixture for the manufacture of the linear polyester prior to or during polycondensation. In this case, however, the subsequent polycondensation in the melt should not last longer than 3 hours.

The polyester composition should contain as little moisture as possible, preferably less than 0.01% by weight of water.

To keep low the absorption of moisture the granulated polyester molding composition can be provided with a coating of an inert hydrophobic substance, for example a paraffin or wax.

Such a wax may also improve the flow properties, i.e. the rheological properties of the polyester composition. To further improve the mold release properties of the shaped articles special mold release agents may be added to the finished polyester granules, for example neutral or partially neutralized montan wax salts or montan wax ester salts, alkali metal paraffin sulfonates and alkali metal olefin sulfonates.

To improve the impact strength the polyesters may be mixed in known manner with suitable high molecular weight polymers, for example, copolymers of ethylene with vinyl acetate, ethylene with acrylic esters or butadiene with styrene.

The non nucleating linear polyester in the finished molding composition should have a reduced specific viscosity in the range of from 0.9 to 2.0 dl/g, preferably 1.0 to 1.6 dl/g, measured with a solution of 1 gram of the polyester in 100 milliliters of a mixture of phenol and tetrachloroethane in a weight ratio of 3 : 2 at 25°C. If the non nucleating polyester portion of the molding composition has too low a reduced specific viscosity, the molding composition can be after-condensed in known manner in the solid state. When the molding composition is prepared by homogenization in the extruder, a possible decomposition of the polyester and a drop of the reduced specific viscosity should be taken into account when selecting the starting polyester.

In order to produce injection molded articles having a good degree of crystallization, the temperature of the mold should be kept sufficiently above the second order transition temperature. With polyester molding compositions on the basis of a modified polyethylene terephthalate a mold temperature in the range of from 120° to 160°C is preferred.

The molding compositions according to the invention can be used for the manufacture of high quality shaped articles having a high dimensional stability, for example gear wheels, ball joints, rack gears, coupling disks and guide elements.

The following examples serve to illustrate the invention:

EXAMPLE 1

Manufacture of the nucleating agent a. 1 Kilogram of polyethylene terephthalate, containing 0.66% by weight, incorporated by condensation and calculated on the polyethylene terephthalate, of cyclopentane tetracarboxylic acid, and having a reduced specific viscosity of 0.74 dl/g, measured at 25°C with a solution of 1 g of polyester in 100 milliliters of a mixture of phenol and 1,1,2,2-tetrachloroethane in a weight ratio of 3 : 2, was treated for 40 hours at 280°C in a rotating glass flask under a pressure of 0.5 mm of mercury. After that period of time the granules were insoluble in the above solvent. It was ground in a micronizer and passed through a sieve. A fraction having an average particle size of 50 microns was used as nucleating agent.

b. A nucleating polyester was prepared as described sub (a) with the exception that 0.64% by weight of 1,1,4,4-tetramethylol cyclohexane was used as modifier. Prior to after-condensation the polyester had a specific viscosity of 0.75 dl/g.

c. A nucleating polyester was prepared as described in sub (a) with the exception that 1.06% by weight of bisglycidyl ether of bisphenol A were used as modifier. Prior to after-condensation the polyester had a reduced specific viscosity of 0.70 dl/g.

EXAMPLE 2

10 Kilograms of polyethylene terephthalate granules having a grain size of 2.5 mm, a reduced specific viscosity of 1.45 dl/g and a water content of less than 0.005% were mixed for 6 hours in a moisture-tight mixer with 80 grams of the powder obtained as described in sub (a). The granules coated with the powder were injection molded on an injection molding machine into plates of the dimensions 60 × 60 × 2 mm, the temperature of the mold being 140°C. The plates had good mold release properties. The mean density of the plates obtained, in dependence on the respective dwell time in the mold, is indicated in the following table.

EXAMPLE 3

Plates were produced as descibed in Example 12 from polyester granules coated with the powder described in sub (b). The plates had good mold release properties.

EXAMPLE 4

Plates were produced as described in Example 2 from polyester granules coated with the powder described in sub (c). The injection molded plates had good mold release properties.

EXAMPLE 5 (Comparative Example)

Polyethylene terephthalate as defined in Example 2 was injection molded without any addition. The plates could be taken from the mold only with difficulty and with strong deformation only.

Table

| density g. cm$^{-3}$ | dwell time seconds 25 | 45 | 60 |
|---|---|---|---|
| Example 2 | 1.368 | 1.370 | 1.372 |
| Example 3 | 1.369 | 1.371 | 1.373 |
| Example 4 | 1.370 | 1.372 | 1.374 |
| Example 5 | 1.344 | 1.350 | 1.352 |

What is claimed is:

1. A thermoplastic polyester molding composition consisting of a physical mixture of
    a. a linear saturated polyester of one or more aromatic dicarboxylic acids which may contain up to 10% by weight, based on the total weight of dicarboxylic acids, of aliphatic dicarboxylic acids, with saturated aliphatic or cycloaliphatic diols, and
    b. 0.05 to 2% by weight, based on the weight of the linear saturated polyester (a), of a cross-linked saturated polyester of (1) terephthalic acid or an ester-forming derivative thereof, (2) a diol having from 2 to 10 carbon atoms and (3) 0.01 to 3% by weight, based on the weight of the cross-linked saturated polyester, of a cross-linking compound which is a 1,2-epoxide having at least two epoxide groups, 2. The polyester molding composition of claim 1, wherein component (a) is polyethylene terephthalate.

3. The polyester molding composition of claim 1, wherein component (a) is polycyclohexane-1,4-dimethylol terephthalate.

4. The polyester molding composition of claim 1, wherein component (a) is a modified polyethylene terephthalate containing as structural units, besides terephthalic acid, up to 10% by weight, calculated on the total amount of dicarboxylic acids, of isophthalic acid, naphthalene-2,6-diccarboxylic acid or adipic acid.

5. The polyester molding composition of claim 1, wherein component (a) is a modified polyethylene terephthalate which contains, besides ethylene glycol, neopentyl glycol or butanediol-1,4.

6. The polyester molding composition of claim 1, wherein component (a) has a reduced specific viscosity of from 0.9 to 2.0 dl/g, measured at 25°C with a solution of 1 gram of polyester in 100 milliliters of a mixture of phenol and tetrachloroethane in a weight ratio of 3 : 2.

7. The polyester molding composition of claim 6, wherein the component a) has a reduced specific viscosity of from 1.0 to 1.6 dl/g.

8. The thermoplastic molding composition of claim 1 wherein the cross-linking polyfunctional compound in component (b) is a diglycidyl ether of the formula

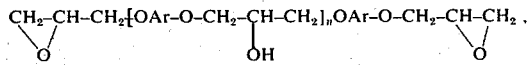

in which Ar represents a bivalent, aromatic radical containing one or several substituted or unsubstituted nuclei which are linked with one another directly or through intermediate structure selected from hetero atoms and aliphatic intermediate links, and in which n is greater than or equal to zero.

9. The thermoplastic molding composition of claim 1, wherein the cross-linking polyfunctional compound in component (b) is an epoxide of the formula

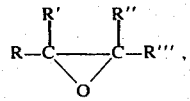

in which R', R'', and R''' represent hydrogen or alkyl groups, R represents an alkyl, cycloalkyl, aralkyl or aryl group which may contain ether groups and contains at least one epoxide group.

10. The thermoplastic molding composition of claim 1 wherein the cross-linking compound is 1,4 butanediol-di[B-methyl-glycidyl]ether.

11. The thermoplastic molding composition of claim 1, wherein the cross-linking polyfunctional compound in component (b) is a cyclic epoxide of the formula

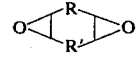

in which R and R' each represent alkylene, cycloalkylene, aralkylene, or arylene groups which may be linked with one another directly or via one or several carbon atoms to form bi- or polycyclic rings and may contain epoxide groups.

12. The thermoplastic molding composition of claim 11, wherein the cyclic epoxide is cyclooctadiene-(1,5)-diepoxide.

13. The thermoplastic molding composition of claim 1, wherein the cross-linking polyfunctional compound in component (b) is a 2,3-epoxypropanol ester of a polyfunctional carboxylic acid having the general formula

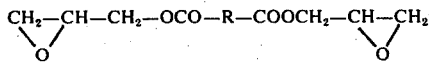

in which R represents an alkylene, cycloalkylene, arylene or aralkylene group which may contain ether groups and further carboxyl groups esterified with 2,3-epoxypropanol.

14. The thermoplastic molding composition of claim 13, wherein the 2,3-epoxypropanol ester is bis-2,3-epoxypropanol succinic acid ester.

15. The thermoplastic molding composition of claim 1, which additionally contains copolymers of ethylene with vinyl acetate, ethylene with acrylic esters, or butadiene with styrene.

16. Injection molded articles made from the thermoplastic molding composition of claim 1.

17. A thermoplastic polyester molding composition consisting of a physical mixture of
   a. a linear saturated polyester of one or more aromatic dicarboxylic acids which may contain up to 10% by weight, based on the total weight of dicarboxylic acids, of aliphatic dicarboxylic acids, with saturated aliphatic or cycloaliphatic diols, and
   b. 0.05 to 2% by weight, based on the weight of the linear saturated polyester (a) of a cross-linked saturated polyester of (1) terephthalic acid or an ester forming derivative thereof, (2) a diol having from 2 to 10 carbon atoms and (3) 0.01 to 3% by weight, based on the weight of cross-linked saturated polyester, of an organic cross-linking polyfunctional compound having functional groups selected from hydroxyl, carboxyl and 1,2-epoxide groups, at least one of which is a 1,2-epoxide group.

18. A method of nucleating a linear saturated polyester which comprises incorporating therein from 0.05 to 2% by weight, calculated on the weight of said polyester, of a cross-linked saturated polyester of
   a. terephthalic acid or an ester-forming derivative thereof,
   b. a diol having from 2 to 10 carbon atoms, and
   c. 0.01 to 3% by weight, calculated on the cross-linked polyester of a 1,2-epoxide having at least two epoxide groups.

* * * * *